July 28, 1936.  H. J. MURRAY  2,048,883
SYNCHRONIZING DEVICE
Filed Jan. 11, 1929
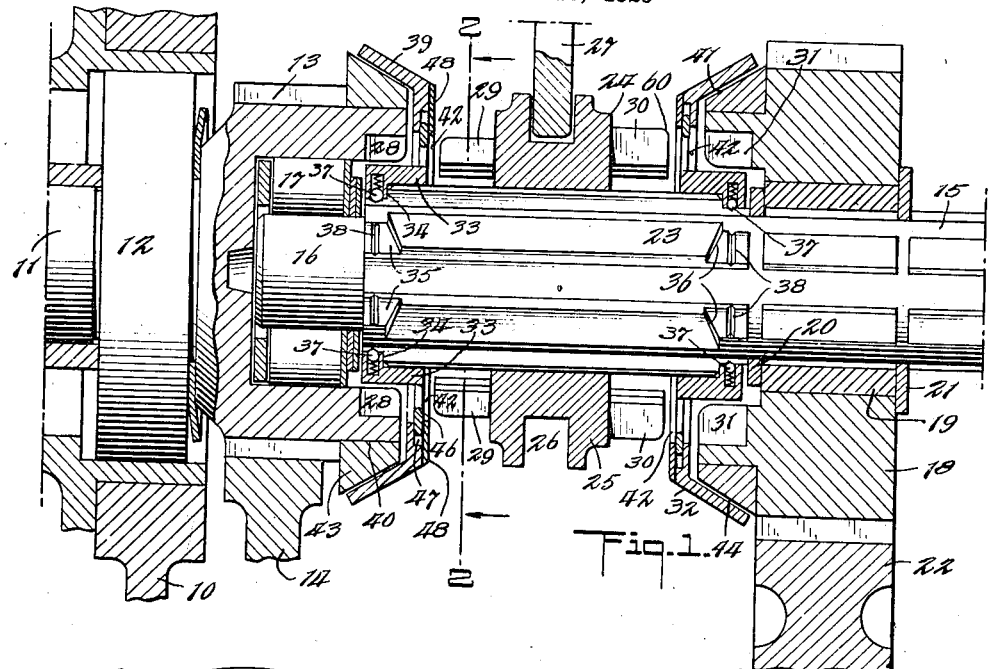
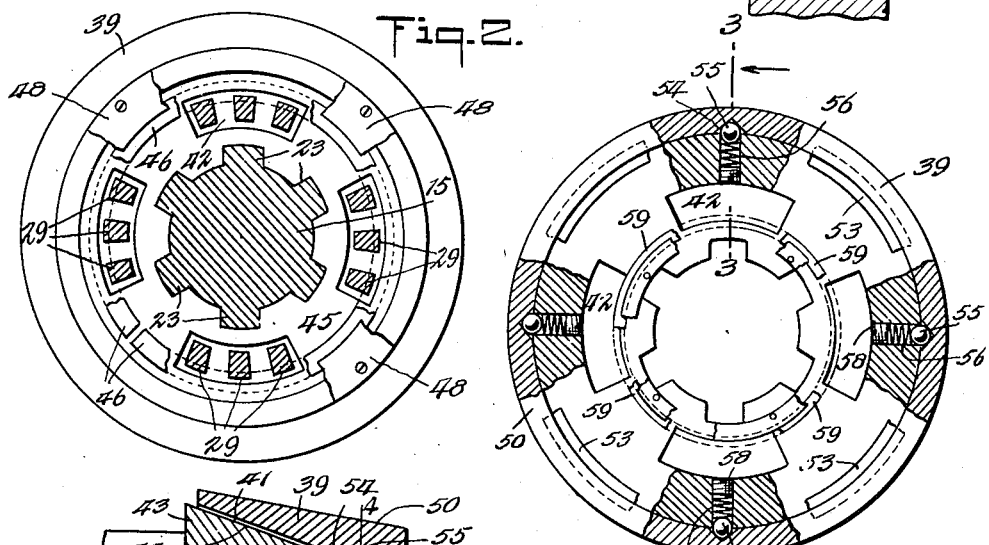
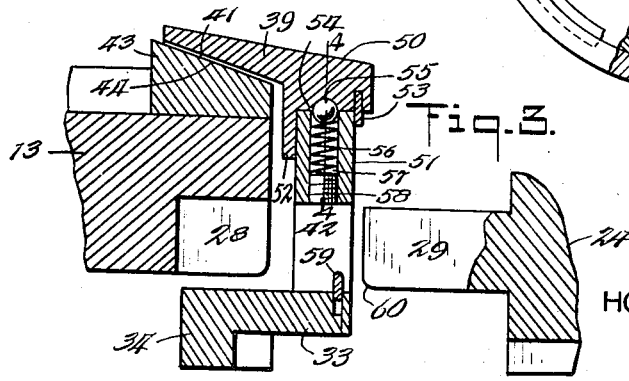
INVENTOR
HOWARD J. MURRAY
BY
Warren S. Orton
ATTORNEY Patented July 28, 1936

2,048,883

UNITED STATES PATENT OFFICE 2,048,883

SYNCHRONIZING DEVICE

Howard J. Murray, New York, N. Y., assignor, by mesne assignments, to Borg-Warner Corporation, Chicago, Ill., a corporation of Illinois Application January 11, 1929, Serial No. 331,944

32 Claims. (Cl. 192—53)

The invention relates to a synchronizing device of the type of such devices which cause a shaft and an axially disposed gear to approach the same speed before they are connected through a positive clutch form of connector, and the invention specifically relates to a constant mesh transmission mechanism of the type commonly used in automotive power transmission devices for effecting a direct drive and a second speed drive between the engine shaft and the propeller shaft.

The primary object of the invention is to improve the synchronizing devices for use in such situations. Among the other and incidental objects of the invention is to provide a simple form of synchronizing device which will provide for a relatively large area of contact in its frictional clutch feature and thus provide for decreased unit pressure with reduction of wear, and at the same time feature the maintenance of a small compact construction which will not materially increase the overall dimensions in conventional forms of automotive change speed power transmitting devices now in general use; which will permit the utilizing of the available manual force acting on the shift rod to decrease the time necessary to effect synchronization; which will provide for a ready replacement of the wearable clutch elements; which will utilize parts susceptible of being formed economically as factory production in large quantities, and which will employ the difference in speed of the two members to effect the said synchronization.

Still another object of the invention is to provide a form of synchronizer which will be particularly smooth in its operation and thus tend to minimize jars or abnormal strains on the relatively movable parts.

Still another object of the invention is to provide a fool-proof or safety form of synchronizer which will automatically release its clutching elements when an attempt is made to transmit abnormal torque stresses through its friction clutch.

Various other objects and advantages of the invention will be in part obvious from an inspection of the accompanying drawing and in part will be more fully set forth in the following particular description of one form of mechanism embodying the invention, and the invention also consists in certain new and novel features of construction and combination of parts hereinafter set forth and claimed.

In the accompanying drawing,

Fig. 1 is a view in vertical axial section of part of a change speed automotive power transmission mechanism showing a preferred embodiment of the invention installed therein;

Fig. 2 is a transverse sectional view taken on the line 2—2 of Fig. 1 looking in the direction indicated by the arrows;

Fig. 3 is an enlarged showing of part of the structure shown at the upper left side of Fig. 1 in connection with a modified form of synchronizer taken on the line 3—3 of Fig. 4; and Fig. 4 is a view in elevation on the plane corresponding to the plane indicated by the line 2—2 of Fig. 1 with parts broken away on the line 4—4 of Fig. 3 and illustrating the slip clutch form of synchronizer shown in the modified showing of Fig. 3.

In the drawing and referring particularly to the showing in Fig. 1, there is shown part of transmission containing casing 10 through one end of which is intruded the engine shaft 11 mounted in an anti-friction device 12 and having its intruded end enlarged to provide the main power gear 13 in mesh with the jack shaft driving gear 14 mounted on the jack shaft (not shown). Disposed in axial alignment with the shaft 11 is the propeller shaft 15, a reduced end 16 of which is rotatably mounted in roller bearings 17 contained within a recessed end of the gear 13.

Loosely mounted upon the shaft 15 is a second speed gear 18 mounted on bushing 19 and held in place against longitudinal shifting by stop plates 20, 21. The gear 18 meshes with a gear 22 carried on the jack shaft. It is understood that the construction thus far described is conventional and the showing is intended to represent the installation of the invention featured herein in connection with any form of automotive power transmission now in general use.

Also following conventional structures, the portion of the shaft 15 between the gears 13 and 18 is provided with splines 23 six being shown in Fig. 2 and on which portion of the shaft is splined a shift member 24. This member includes a rugged central ring 25 provided with a peripheral slot 26 in which rides a manually actuated shift finger 27 by means of which the member 24 as a whole is slid conventionally to the left from the neutral position shown in Fig. 1 to effect a direct drive between the shafts 11 and 15 or to the right to effect a second speed drive from the shaft 11 through gears 13, 14, jack shaft (not shown), gears 22, 18 and through the shift member 24 to shaft 15.

For the purpose of clutching the engine shaft 11 to the propeller shaft 15, the gear 13 is provided with teeth 28 forming an internal gear or female clutch element adapted to be engaged by prongs or teeth 29 formed on the adjacent end of the member 24 and designed to coact with teeth 28 to provide a positive clutching engagement between the member 24 keyed to the shaft 15 and the power gear 13. Similarly, the opposite end of the shift member 24 beyond the central ring 25 is provided with teeth 30 which engage teeth 31 on the adjacent side of gear 18 to provide a similar positive clutching engagement between slide member 24 splined to the shaft 15 and the second speed gear 18. The teeth 29 and 30 are each arranged in circumferentially spaced apart sets, of which three teeth are in each set in the case of the showing in Fig. 2.

Positioned between the shaft 15 and the gears 13 and 18 is a pair of synchronizing devices operatively connected to cause gear 13 and shaft 15 to approach the same speed as the shift fork 27 is moved to the left from the neutral position shown, and when shifted in the opposite direction, that is to the right from the neutral position shown, will cause gear 18 and shaft 15 to approach a desired speed relation. As these synchronizing devices are of similar construction except for obvious reversal in parts, the detail description of one will be sufficient for the other.

The synchronizing device includes a relatively light ring shaped member 32, hereinafter referred to as a synchronizer, and which includes a long hub portion 33 mounted for the greater part of its length on the splines 23 and capable of having a slight rotary as well as axial movement on the shaft. One end of the hub 33 is formed into a flange 34 which engages and rides on a smooth reduced cylindrical portion 35 of the shaft splines 23. This flange 34 has its inner side facing the splines beveled to engage with the beveled or cammed ends 36 of the splines 23 and which beveled sides and splines coact to shift the synchronizer into its operative clutching position as an incident to the relative rotary movement between the shaft and synchronizer as is more fully disclosed in my copending application Serial No. 50,279 renewed October 17, 1928.

Spring pressed balls 37 carried by the flange 34 engage in recesses 38 formed in the smooth portions 35 and tend to maintain the synchronizer in position engaging the cam ends of the splines as more particularly disclosed in my Patent Number 1,828,508 granted October 20, 1931.

The outer edge of the synchronizer forms a flange or shroud 39 which overlaps a ring-like extension 40 which projects from the adjacent face of the associated gear 13 or 18 as the case may be. The flange 39 has its inner face beveled as shown at 41 to form the female element of a friction clutch of the cone type. The portion of the synchronizer between the hub 33 and the flange 39 extends outwardly of the shaft, is integral with the hub and flange in the showing in Fig. 1 and is provided with four openings 42 extending therethrough and facing the internal gear teeth 28 or 31 of the associated power gears 13 or 18.

Fitted within the flange 39 is a replaceable ring 43 preferably of some friction creating material, forming the outer periphery of the ring-like extension 40 and having its outer face beveled as shown at 44 to form the male element of the friction clutch.

It is suggested that the portion of the synchronizer between the hub and flanged rim forming the friction clutch element be simply a plain ring-shaped part provided with the requisite number of arcuate slots 42 to receive the sets of clutch teeth 29. This structure has the advantage of simplicity and minimized cost but has the disadvantage in that the ends of the teeth 29 sometimes bind against the spoke portions 45 between the openings 42 with a resulting delay in the synchronizing effect. In order to insure the elimination of any binding effect at this point and the providing of a smoother and quicker frictional connection between the synchronizer and the teeth on the shift member, it is suggested in the showing in Fig. 1 that a deterrent spring 46 be secured to the synchronizer and normally disposed in the path of axial movement of the teeth 29 or 30 as the case may be. The deterrent ring is simply a split circular spring mounted in a recess 47 and secured in place by fasteners 48. The edges of the teeth which are designed to engage this ring are rounded off as shown at 60 and in general it will be understood that the structure at this place corresponds to the deterrent spring disclosed in Patent No. 1,828,508, October 20, 1931.

Under some circumstances such for instance as when an attempt is made to shift gears while travelling at high speed and without shifting the clutch the entire torque forces are transmitted through the relatively frail synchronizer with the possibility that the parts may become distorted. In order to provide for such contingency, it is suggested in the form of the invention disclosed in Figs. 3 and 4 that an arrangement be provided to permit a slippage of the parts under those conditions where the torque forces transmitted through the friction clutch exceed the clutching capacity of the clutch. For this purpose, the portion of the synchronizer between the hub 33 and the flange 39 is divided into two parts, one part 50 including the flange 39 and the other part 51 containing the openings 42 and integral with the hub 33. The part 50 is provided on one side with a flange 52 which engages one side of the ring portion 51 and which ring portion is secured in place by a lock flange 53. The inner face of the part 50 engaged by the outer periphery of the part 51 is provided with a plurality, in this case shown to be four recesses 54 and the part 51 is similarly provided with four plungers 55 in the form of spherical rollers normally maintained in engagement with an associated recess by means of a backing spring 56 contained in a radially disposed recess 57 and maintained in position by a backing nut 58 access to which is provided through the opening 42. It is obvious that by adjusting the position of the nut 58 the tension on the spring 56 may be varied and in this way there is provided an adjustable means for regulating the tension at which the parts 50 and 51 are secured together and which will also control the tension at which the parts are released as when the friction clutch becomes "frozen". In the showing in Fig. 3 there is disclosed a retardent spring 59 corresponding to the spring 46 in the showing of Fig. 1 except that it is positioned on the inner side of the opening 42 rather than on the outer side as is the case in the form of the invention shown in Fig. 1.

In operation and assuming that the shafts 11 and 15 have relative movement and that it is desired to effect a direct or high speed drive between the shafts 11 and 15, the shift fork 27 is moved to the left from the position shown in the figure. The initial movement of the sliding member 24 is to cause its advance end to bear directly against the ring-like synchronizer as would be the case where there is no deterrent spring used. In those cases where a deterrent spring is used as is the case in the showings in Figs. 1 and 3, the rounded edge 60 of the advancing teeth will bear on the spring 46 or 59 as the case may be respectively expanding and contracting the same and by reaction causing the spring to engage the teeth of the slide member. In either case, there will be a loose clutching action between the slide member 24 and the synchronizer which will tend to cause these members to approach the same speed. At the same time the synchronizer will be shifted slightly in an axial direction as it is carried with the slide member until the synchronizer is brought into frictional clutching engagement with its corresponding clutch element on the power gears 13 or 18. At this time, the shaft 15 will tend to overrun the shaft 11, or the reverse. In either case the cams 36 will react against the synchronizer to force the same more firmly into its clutching engagement with the gear 13 as is more fully disclosed in the above identified copending application. It is obviously within the scope of this disclosure, however, to omit the cam action and to effect the frictional clutching engagement solely from the manual efforts of the operator acting through the shift fork 27. In either case, the shafts 11 and 15 are brought to the same speed and a continued movement of the sliding member 24 to the left will permit the sets of external or clutch gear teeth 29 to pass through the openings 42 into direct clutching engagement with the internal teeth 28 thus completing a positive clutching engagement between the shafts 11 and 15 through the slide member and gear 13. The openings 42 in the synchronizer are of sufficient circumferential lengths to permit the spaced teeth 29 to pass therethrough and the synchronizer, of course, turns with the clutched members as long as the interdriving connection is maintained. When it is desired to disengage the parts, the shift lever 27 is moved conventionally to the right and into the neutral position illustrated. This permits the synchronizer to turn with the shaft and free of its clutching engagement with the male clutch elements. It is preferable, however, to positively insure the declutching of the friction clutch member and the maintaining of the synchronizer in engagement with the cams 36 and for this reason the spring acting resetting devices 37 are utilized. The balls in their spring pressed tendency to engage in the grooves 38 will secure the hub 33 in position as shown in Fig. 1 with the friction clutch surfaces spaced apart slightly.

It is understood that should it be desired to effect a second speed drive through the mechanism, the shift fork 27 is similarly moved to the right and there is effected in sequence a movement of the synchronizer to the right and into clutching engagement with gear 18 thus causing gear 18 to turn at the same speed as shaft 15 after which the direct positive drive is provided between the clutch teeth 30, 31, the teeth 30 passing through the openings in the synchronizer as has been previously described for the direct drive connection.

Should it so happen that the torque which is attempted to be transferred through the synchronizer should exceed that torque for which the device has been preset by the adjustment of the screws 58, it would simply mean that the flange 39 would engage its coacting element 43 thus connecting the part 50 with gear 13, shown in Fig. 3, but part 51 would turn idly with the slide member 24.

By means of a device such as is disclosed, there is provided a highly efficient and compact form of double acting synchronizer controlled by a single manually actuated shift fork for effecting at will either a direct or second speed drive between the aligned power shafts and the introduction of the synchronizer in the form herein disclosed has not added materially to the over-all dimensions of such constructions. As the cone type friction clutches are formed of the size of the gears within the outlines of the gear as shown at the right of the figure, and as a built up extension of the gear as shown to the left of the figure there has been attained a cone clutch having an extensive area of clutching engagement, without interfering with the other parts of the automotive transmission mechanism. With the relatively large area of frictional clutch surface provided with the external form of cone clutch illustrated there has been provided an extensive area of friction surface which results in a reduction of unit pressure necessary to effect synchronization. Incidentally there is attained a reduction in wear of the friction faces. Due to the increase in radius of the friction clutch the available manual energy has been utilized to a greater mechanical advantage while equalizing the momentum of the two members to be synchronized, or differently expressed, there has been attained a decrease in synchronizing interval with the same available manual force.

The providing of the openings in the synchronizer permits the mounting of the synchronizer on the portion of the shaft between the gear and sliding member and positions the clutch faces outwardly of the shaft and in available space to accommodate their relatively large size. At the same time, the parts which are designed to carry the load can be made massive and positioned close to the carrying shaft. As the synchronizer is not required to transmit torque forces except for the instant in which it is functioning to effect synchronization, this member may be made relatively light and thus possess relatively small momentum. It will be noted that the power gears can be formed conventionally by the ordinary tooth forming machinery and the friction clutch element carried thereby and which is most likely to wear may be replaced and likewise the light synchronizer may be replaced when worn simply by withdrawing the shaft 15, slipping the new synchronizer in place of the worn member and without otherwise dismantling the transmission parts.

I claim:

1. In a device of the class described, the combination of a shaft, a power member mounted for rotary movement about the axis of the shaft and provided with an element of a positive clutch and with an element of a friction clutch, a one piece slide member splined to the shaft and provided with the coacting element of the positive clutch, mechanism for causing the shaft and power member to approach the same speed, said mechanism including a ring-like member mounted on the shaft to turn therewith and means carried thereby constituting the coacting element of the friction clutch, a slip clutch connection between the ring-like member turning with the shaft and said coacting element of the friction clutch, said ring-like member having an opening extending therethrough to permit said coacting element movable with the slide member to engage the power member and thus positively connect the shaft and power member and a single control engaging said slide member to cause the same to slide to and from its positive clutch driving position and acting therethrough to cause the synchronizing means to function prior to the interengagement of the teeth.

2. In a device of the class described, the combination of two members adapted to be moved into driving relation, synchronizing means for causing the members to approach the same speed before being moved into said driving relation, said synchronizing means including a friction clutch drive between the members, camming means for causing the friction clutch drive to become effective, one of the elements of said friction clutch drive including two parts, one part provided with one of the friction faces of the clutch and the other part being operatively connected to one of said members to turn with the same, and a resilient slip and normally positive driving connection between the parts normally connecting the same in non-rotative relation so as to cause them to turn one with the other and permitting the parts to slip past each other when the torque forces acting through the friction clutch are greater than the clutching capacity of said clutch.

3. In a device of the class described, the combination of two members adapted to be moved into driving relation, synchronizing means for causing the members to approach the same speed before being moved into said driving relation, said synchronizing means including a friction clutch drive between the members, one of the elements of said friction clutch drive including two parts, one part provided with one of the friction faces of the clutch and the other part being operatively connected to one of said members to turn with the same, means between said other part and said member for forcefully causing the friction faces to interengage and a releasable clutching means between the parts of the synchronizer normally connecting the parts positively one with the other and capable of being shifted and thus released automatically when subjected to abnormal relative rotative effect.

4. In a device of the class described, the combination of two members adapted to be moved into inter-driving relation, mechanism for causing the same to approach the same speed before being moved into such relation, said means including a friction clutch with one element secured to one of the members and the other element constituting a movable element adapted to be connected to the other member to turn therewith, said other element including a slip clutch for locking the members in a positive driving relation and for permitting a freedom of relative movement between the members under certain conditions even when the friction clutch is actively disposed and camming means acting on the friction clutch to cause it to become operative.

5. In a device of the class described, the combination of two members adapted to be moved into inter-driving relation, mechanism for causing the same to approach the same speed before being moved into such relation, said means including a friction clutch with one element secured to one of the members and the other element constituting a movable element adapted to be connected to the other member to turn therewith, camming means acting on the movable friction clutch element to drive the same from said other member, said other element including a slip clutch for locking the members in a positive driving relation and for permitting a freedom of relative movement between the members under certain conditions even when the friction clutch is actively disposed, and means for varying the intensity of clutching engagement of said slip clutch.

6. In a device of the class described, the combination of two members adapted to be connected to drive one from the other, synchronizing means for causing the members to approach the same speed, said means including a friction clutch connection between the members and said connection including a slip clutch for locking the members in a positive driving relation and for permitting relative rotary movement of the members with the friction clutch in clutching position and camming means for shifting the friction clutch forcefully into its operative clutching position.

7. In a device of the class described, the combination of a shaft, a gear loosely mounted for rotary movement on the shaft and provided on one side with clutch teeth and a bevel face forming an element of a friction clutch of the cone type, a slide member keyed to the shaft and provided with teeth adapted to engage the teeth on the gear to provide a positive clutch drive between the shaft and gear, and synchronizing means between the gear and slide member for causing the gear and shaft to approach the same speed, said synchronizing means including a synchronizer turning with the shaft and providing the coacting element of the friction clutch and said synchronizer provided with an opening to permit the passage therethrough of the teeth on the slide member in their movement into and from their engagement with the teeth on the gear, and said synchronizer provided with a deterrent spring projecting into said opening and adapted to be engaged by the teeth on the slide member to provide a frictional slip engagement between the synchronizer and the slide member and means for automatically breaking the connection between the friction clutch and the shaft when the friction clutch is overloaded.

8. In a device of the class described, the combination of a shaft, a power member mounted for rotary movement about the axis of the shaft and provided with an element of a positive clutch and with an element of a friction clutch, a slide member splined to the shaft and provided with the coacting element of the positive clutch, mechanism for causing the shaft and power member to approach the same speed, said mechanism including a ring-like member mounted on the shaft to turn therewith and constituting the coacting element of the friction clutch, said ring-like member having an opening extending therethrough to permit said coacting element movable with the slide member to engage the power member and thus positively connect the shaft and power member, and said ring-like member provided on one side with a deterrent spring projecting into said opening and adapted to be engaged by and distorted by said coacting element to provide a frictional engagement between the ring-like member and the slide member and said ring-like member including a releasable positive driving connection between the part thereof provided with the opening and the part thereof which forms the friction clutch element.

9. In a device of the class described, the combination of two members provided with means for positively clutching one with the other, synchronizing means for causing them to approach the same speed, said means including a friction clutch connection between the members, one element of said connector provided with an opening to permit a part of the positive clutching means to pass the same, said element provided with a spring disposed in the path of movement of said part to frictionally connect the element and said part and said friction clutch connection including a resilient slip connection for automatically breaking the connection when overloaded.

10. In a device of the class described, the combination of the two elements of a positive clutch, synchronizing means for causing them to approach the same speed, said means including a friction clutch with one of its shiftable elements disposed between the positive clutch elements and said shiftable element including a part adapted to be disposed in the path of movement of one of the positive clutch elements and adapted to be engaged thereby and shifted thereby into its frictional clutching position, and a semi-positive clutch connecting said part disposed in the path of said positive clutch element and the part which forms the shiftable element of the friction clutch.

11. In a device of the class described, the combination of two members of a positive clutch, synchronizing means therebetween for causing them to approach the same speed as they are moved towards their positive clutching relation, a manually actuated control for causing in succession the synchronizing means to function and then the positive clutch to assume its clutching position, said means including a friction clutch of the cone type and means controlled by the load transmitted through the conical friction clutch for releasing the driving connection through the same.

12. In a device of the class described, the combination of a shaft provided with a cam surface, an element of a positive clutch rotatably mounted about the axis of the shaft, a synchronizer provided with an opening, a coacting element of the positive clutch movable through said opening and said synchronizer provided with means coacting with said cam surface to shift the synchronizer into operative position and means for causing the synchronizer to become functionally inoperative when overloaded.

13. In a device of the class described, the combination of two rotative members adapted to be connected to drive one from the other, one of said members comprising a shaft and the other a power gear mounted for rotary movement about the axis of the shaft, said gear provided with teeth forming an internal gear constituting an element of a positive clutch and provided with a bevel surface constituting an element of a friction cone clutch, synchronizing means for causing the two members to approach the same speed before they are disposed in their interdriving relation through said positive clutch, said means including a bearing ring-like portion encircling and spaced outwardly of the shaft, a synchronizer mounted on said bearing ring portion provided with a bevel surface constituting the coacting element of the friction cone clutch, said bearing ring like portion having an opening extending therethrough adapted to face the internal gear teeth, and a shift member splined to the shaft to turn therewith and shiftable longitudinally thereon to and from an operative engagement with the synchronizer and gear, means operable as an incident of the shifting of the shift member towards the synchronizer to cause the friction clutch to connect the shaft and power gear, said shift member provided with teeth forming an external clutch member constituting the coacting element of the positive clutch, the advanced portion of said external teeth adapted successively to shift the synchronizer axially into its friction clutching position and then pass through the opening to engage the internal teeth to interconnect the members following the functioning of said synchronizing means.

14. In a device of the class described, the combination of a shaft, a power gear loose on the shaft and having teeth forming part of a positive clutch and having a bevel face constituting an element of a conical friction clutch, synchronizing mechanism for causing the gear and shaft to approach the same speed, said mechanism including two concentric members adapted to be mounted on the shaft and comprising a mounting ring and a synchronizer, said ring mounted on the shaft, an outwardly extending wall and a cylindrical periphery providing a bearing, said synchronizer carried by said bearing provided with a flange constituting the coacting element of the conical friction clutch, said outwardly extending wall provided with an opening extending therethrough and adapted to face the power gear teeth, a shift member splined to the shaft and provided with teeth adapted in its movement in one direction successively to cause the friction clutch to become operative and then to pass through the opening in the ring and into mesh with the teeth on the gear and thus provide a positive drive between the power gear and the shaft through said shift member.

15. In a device of the class described, the combination of two elements of a positive driving dental clutch, one shiftable relative to the other, synchronizing means for causing them to approach the same speed, said means including a friction clutch with one of its elements shiftable, disposed between the positive clutch elements, and including a part disposed in the path of movement of one of the positive clutch elements and adapted to be engaged thereby and shifted thereby into its frictional clutching position, said shiftable element of the friction clutch constituting a light weight ring constructed to have low momentum when rotating, and a bearing therefor, positioned exteriorly of the path of movement of the shiftable dental clutch elements.

16. In a device of the class described, the combination of a shaft, a member constituting an element of a positive clutch mounted for rotary movement about the axis of the shaft, synchronizing means including a friction clutch element for causing the shaft and positive clutch element to approach the same speed, said member provided with the coacting element of the friction clutch, said synchronizing means including a bearing element mounted on the shaft and provided with an opening extending therethrough, a ring constituting a shiftable element of the friction clutch mounted on and encircling said bearing element and movable relative thereto, and a coacting positive clutch forming element splined to the shaft to turn therewith and shiftable thereon to engage and shift the shiftable friction clutch element into operative position, and to pass through the opening in the bearing element to engage the first named positive clutch element.

17. In a device of the class described, the combination of a shaft, a member provided with an element of a positive clutch and with an element of a friction clutch, a control member splined to the shaft to turn therewith and provided with the coacting element of the positive clutch, mechanism for causing the positive clutch elements to approach the same speed before they are moved into their positive clutching relation, said mechanism including two telescoped members rotatably mounted one on the other, with the inner member mounted on the shaft and the outer member provided with the coacting element of the friction clutch, one of said telescoped members disposed in the path of movement of the control member and shifted thereby to cause the friction clutch to become operative prior to the movement of the positive clutch elements into their clutching position.

18. In a device of the class described, the combination of a shaft, a member provided with an element of a positive clutch and with an element of a friction clutch, a control member splined to the shaft to turn therewith and provided with the coacting element of the positive clutch, mechanism for causing the positive clutch elements to approach the same speed before they are moved into their positive clutching relation, said mechanism including two telescoped members rotatably mounted one on the other, with the inner member mounted on the shaft and the outer member provided with the coacting element of the friction clutch, one of said telescoped members disposed in the path of movement of the control member and shifted thereby to cause the friction clutch to become operative prior to the movement of the positive clutch elements into their clutching position, and camming means actuated from the momentum of the parts to be synchronized and operatively responsive to the movement of the friction clutch elements into their clutching position for increasing the intensity of the clutching action of the friction clutch.

19. In a power transmission mechanism, two coaxial power transmission members adapted to be coupled or uncoupled, one of said members having an external row of teeth forming a gear adapted to be connected to a companion gear, an extension projecting axially from one side of said gear, said extension provided with an annular row of gear-like clutch teeth, and a conical friction clutch surface radially spaced from and concentric with the row of clutch teeth, a toothed clutch element and a conical friction clutch element both carried by and in direct driving engagement with the other power transmission member, said last named tooth clutch and friction clutch elements being axially movable independently of each other into and out of engagement with their companions, said axially movable friction clutch element consisting of a hub providing a long bearing engagement with the other power transmission member, and a radially extending disk projecting from the hub interposed between the axially movable toothed clutch element and said gear forming member with its gear-like clutch teeth, said friction clutch element provided with a conical friction surface adapted to engage the friction surface of its companion, said axially movable toothed clutch element having angularly spaced and radially extending teeth spaced outwardly from the other power transmission member to pass over the hub arranged to be moved from a position spaced to one side of the friction disk into the radially projected zone containing the interengaged conical friction surfaces and into interlocking engagement with the gear-like teeth of its companion, and one row of teeth contained within the outline of the other to form an internal gear drive.

20. In a power transmission, a composite clutch comprising a jaw clutch element having an annular row of gear-like teeth and a friction clutch element having a friction surface, said row of teeth and friction clutch surface disposed with one encircling the other, an axially movable jaw clutch element having teeth adapted to interlock with the gear-like teeth of its companion, an axially movable friction disk provided with a conical friction surface adapted to engage the friction surface of its companion, said disk being disposed between the annular row of gear-like teeth and axially movable jaw clutch element and provided with means adapted to permit passage of the teeth on the axially movable jaw clutch element, said friction disk movable into clutching engagement by the axially movable jaw clutch element and resilient means tending to maintain the movable friction disk in its inoperative unclutched position when free of said axially movable jaw clutch element.

21. A power transmission including a spline shaft, a gear rotatable with respect to the shaft and having clutch teeth and a friction clutch surface, a shiftable power transmission element having clutch teeth for connecting the gear to the shaft and having a recess formed therein, a hollow friction device in the form of a disk provided at its inner periphery with a long hub projecting axially of the shaft in one direction from the disk and provided at the end remote from the disk with radially projecting means fitting between the splines of the shaft and with a conical friction face radially spaced from its inner perimeter for coacting with the friction surface on the gear, said friction disk disposed between the gear and the shiftable element for synchronizing the speed of said gear and said shiftable element, the hub of said friction device adapted to be received in the recess of the shiftable element to permit shifting of the shiftable element past the friction device and into driving engagement with the gear and means for shifting the shiftable gear and for causing the friction device to function.

22. In a device of the class described, the combination of a shaft, a power member mounted for rotary movement about the axis of the shaft, said power member provided with a ring-like extension, one periphery of which extension when in operative position forms an element of a cone type friction clutch and the other periphery of which is provided with teeth forming a clutch member, a synchronizing mechanism for causing the shaft and power member to approach the same speed, said mechanism including a ring-like member comprising a long sleeve constituting a hub carried by the shaft and turning therewith, said sleeve provided at one end with an outwardly extending web, a flange at the outer end of the web and provided with a surface adapted to coact with said friction element to form a friction clutch of the cone type, said ring-like member designed to provide a clearance facing the teeth of the power member and a slide member splined to the shaft provided with a shift finger receiving slot and on one side of said slot with teeth spaced outwardly from the shaft to pass over the hub and forming a clutch member at one end of the slide member, said slide member adapted to be disposed in a neutral position with its clutch member spaced from and thus disconnected from the power member and from said ring-like member, and said slide member adapted to be moved from said neutral position towards the power member to cause the clutch member on the advancing end to pass across said clearance and thus by-pass the ring-like member and to engage the teeth on the power member and means operable in one direction for shifting the slide member and for causing the synchronizing mechanism to become operative.

23. In a device of the class described, the combination of two rotative members adapted to be connected to drive one from the other, one of said members comprising a shaft and the other a power gear mounted for rotary movement about the axis of the shaft, said gear provided with teeth forming an element of a positive clutch spaced axially outwardly from the shaft to provide a clearance therebetween and provided with a bevel surface constituting an element of a friction cone clutch, synchronizing means for causing the two members to approach the same speed before they are disposed in their interdriving relation through said positive clutch, said means including a synchronizer including a hub carried by the shaft and intruded into said clearance, said means also to provide a clearance therebetween, provided with a bevel surface constituting the coacting element of the friction cone clutch, a shift member provided with teeth forming the coacting element of the positive clutch, splined to the shaft to turn therewith and shiftable longitudinally thereon to and from an operative engagement with the synchronizer, the bevel friction cone clutch surface on the synchronizer being radially spaced from the path of movement of the teeth on the shift member and means operable as an incident of the shifting of the shift member towards the synchronizer to cause the friction clutch to frictionally connect the shaft and power gear and the teeth of the shift member adapted to pass the synchronizer to engage the teeth of the power gear to interconnect the members following the functioning of said synchronizing means.

24. In a device of the class described, the combination of a shaft, a power gear loose on the shaft and provided on one side with a ring-like extension having teeth on one periphery and a friction face constituting an element of a conical friction clutch, synchronizing mechanism for causing the gear and shaft to approach the same speed, said mechanism including a ring carried by the shaft, shiftable axially thereon, turning therewith and including an inner sleeve forming a hub engaging the shaft and an outwardly extending part projecting from one end of the sleeve, having one face beveled and constituting the coacting element of the friction clutch, a shift member splined to the shaft and including a rugged central portion having a peripheral slot, means acting to cause the synchronizing mechanism to function, and including a shift finger engaging in said slot to move the shift member, said central portion of the shift member provided on the side of the slot adjacent the ring with axially projecting teeth adapted to by-pass the ring and move into mesh with the teeth on the gear to provide a positive drive between the power gear and the shaft through said shift member as the central portion is moved towards said sleeve, said ring being spaced from the path of movement of the teeth on the shift member thereby to permit the teeth to pass the synchronizer.

25. In a device of the class described, the combination of a shaft, a gear loosely mounted for rotary movement on the shaft and provided on one side with clutch teeth spaced radially from the shaft, and a friction face forming an element of a friction clutch of the cone type, a one piece slide member keyed directly to the shaft and provided on one side with teeth spaced radially from the shaft to provide a clearance between the teeth and shaft, and adapted to engage the teeth on the gear to provide a positive clutch drive between the shaft and gear and provided with a peripheral slot, and synchronizing means between the gear and slide member for causing the gear and shaft to approach the same speed, said synchronizing means including a synchronizer turning with the shaft and having a bevel face providing the coacting element of the conical friction clutch and said synchronizer providing a bearing sleeve fitted between the shaft and the path of movement of the teeth on the slide member and adapted to be received in the clearance between the shaft and teeth, said synchronizer providing a clearance radially spaced from the bearing sleeve and at said path of movement of the teeth to permit the passage of the teeth on the slide member in their movement into and from their engagement with the teeth on the gear, resilient means radially spaced from the faces of the friction clutch, independent of the slide member acting at all times and tending to separate the elements of the cone type friction clutch, and a single control to cause the synchronizing means to function prior to the interengagement of the teeth and including a shift fork engaging in the slot in said slide member to cause the same to slide to and from its positive clutch driving position.

26. In a device of the class described, the combination of a shaft, a gear provided with teeth adapted to mesh with another gear and also provided with a row of gear-like clutch teeth distinct from the first named teeth and with means forming an element of a friction clutch, a slide member including a central portion keyed to the shaft and provided with a row of gear-like clutch teeth projecting axially from one side of the central portion and adapted to coact with the row of clutch teeth on the gear to provide a positive clutch drive between the gear and the shaft, synchronizing means engaging the shaft between the gear and slide member turning with the shaft and having a slight freedom of rotary movement thereon and provided with the coacting element of the friction clutch for connecting the gear and shaft frictionally, the central portion of said slide member also provided on its opposite side with a second row of gear-like clutch teeth adapted to clutch at will with another gear.

27. In a device of the class described, the combination of a shaft, a pair of constantly meshed gears, one of said gears mounted for rotary movement about the axis of the shaft and provided with an element of a friction clutch and an element of a positive clutch, another gear coaxial with and spaced a fixed distance axially from the gear of the pair of gears which is provided with the clutch elements, a slide member having a central portion keyed to the shaft and provided with a shifter fork slot, and also provided on one side of the slot with circumferentially spaced apart sets of teeth secured at their root end to the central portion and otherwise free on all sides thereof, said teeth constituting the coacting element of the positive clutch and on the other side of the slot with teeth for meshing with the teeth of said other spaced gear, a coacting friction clutch element having a slight freedom of axial movement on the shaft to and from its clutching engagement with its companion, and having a part engaged by the shaft to turn therewith, and provided with circumferentially spaced apart openings, one for each set of teeth on the slide member and each opening facing its associated set of teeth, and control means including a shifter fork engaging in said slot and movable in one direction for shifting said coacting friction clutch element and thus causing said friction clutch to function and then said positive clutch to function and movable in the opposite direction for shifting the slide member into driving engagement with said other spaced gear.

28. In a transmission, a driving member having a splined end, a driven member having a splined end adjacent the splined end of the driving member, a slidable positive clutch element having internal splines engaging with the splined end of the driven member and engageable with the splined end of the driving member to provide a positive clutch between the driving and driven members, mechanism for frictionally driving one member from the other prior to being connected positively, said mechanism including means providing a friction surface at the end of the driving member, a two-part frictional clutch element having interdriving means on the adjacent faces of the two parts for driving one from the other and to permit said two parts to have relative movement, one of the parts having means with which the positive clutch element engages when initially moved towards the driving element, the engagement of the positive clutch element, when rotating relative to the other part under conditions where slippage between the elements of the friction clutch is prevented, with said part causing said engaged part to rotate relative to the other part and to the driving member, and said mechanism including camming means operatively dependent upon said rotary movement of the friction element for camming the element axially into frictional engagement with the friction surface on the end of the driving member.

29. In a device of the class described, the combination of a conical clutch element having its end of least diameter exposed, a shaft mounted for rotary movement coaxial with said element, means carried by said shaft and rotatable bodily therewith, said means including a coacting conical friction clutch element having a limited freedom of axial movement relative to the shaft into and from clutching engagement with its companion, camming means operatively responsive to any relative rotary movement between said coacting element and said shaft for forcing said coacting element into clutching engagement with its companion and said means carried by the shaft also including a conical flange encircling the end of least diameter of the first named conical clutch element, said first named means also including an element keyed to the shaft and shiftable thereon into bearing engagement with the portion containing the conical friction face at a point thereon within the outlines of the conical flange thereby to move the clutch elements into interclutching engagement.

30. In a device of the class described, the combination of an engine shaft and a propeller shaft in axial alignment, an engine gear on the engine shaft and a train of gears driven from the engine gear and terminating in a second speed gear mounted for rotary movement on the propeller shaft and axially fixed relative thereto, a slide member including a rugged central portion keyed to the propeller shaft between the engine gear and the second speed gear and provided centrally thereof with a shifter fork slot, mechanism duplicated on opposite sides of said slot and including an element of a friction clutch and an element of a positive clutch forming the adjacent ends of the engine gear and the second speed gear, and said mechanism also including on opposite sides of the slot, fingers projecting from the end of the slide member and each forming the coacting clutch element of the adjacent positive clutch, said fingers being spaced radially outwardly from the shaft to provide a clearance between the same and the shaft, a pair of independent coacting shiftable friction clutch elements one at each end of the slide member and each having a hub sliding on the propeller shaft and adapted to be received in the adjacent clearance and telescoped by the teeth as they are moved towards their positive clutching position, and resilient means carried by each of the shiftable clutch elements and engaged by the adjacent teeth for moving the shiftable clutch element into engagement with its companion as the teeth are moved towards their positive clutching position and said shiftable clutch elements each provided with an opening positioned outwardly from the hub and through which opening the adjacent teeth pass in moving from an inoperative position into their positive clutching position and said slide member when in neutral position having its teeth on opposite ends each spaced from their adjacent shiftable friction clutch element.

31. In an automobile transmission, the combination of an engine shaft having a gear at one end, said gear provided with a ring-like extension having on its inner periphery gear-like teeth forming the female element of a positive clutch and its outer periphery forming the male element of a friction clutch of the cone type, a propeller shaft coaxial with the engine shaft and provided with splines, a shift member keyed to the splined portion of the shaft and provided at one end with teeth forming the male element of the positive clutch, a synchronizer between the gear and propeller shaft for causing them to approach the same speed before the positive clutch elements interengage, said synchronizer comprising two separable parts, one constituting a sleeve fitted to the propeller shaft and provided with integral means engaged by the splines to turn with the propeller shaft and also provided with a resilient detent disposed in the path of movement of the teeth on the slide member as they move towards their clutching position, said detent movable radially by the slide member teeth into an inoperative position removed from the path to permit the advance ends of the teeth to pass the same and the other part comprising a conical flange constituting the female element of the friction clutch, said synchronizer also including an outstanding wall between the flange and sleeve, and coacting therewith to form an annular chamber into which the ring-like extension intrudes and said wall provided with openings through which the advance ends of the slide member teeth pass in their movement into clutching position and control means engaging the slide member to move the same in one direction to cause first an engagement with the detent and therethrough to shift the friction clutch into clutching position and on the continued advance of the slide member to cause the slide member teeth to pass into the openings, to move the detent out of the way and finally to move the positive clutch into its clutching position.

32. In a device of the class described, the combination of a driving shaft provided with elements of a positive and a friction clutch, a driven shaft having a splined portion twice reduced therefrom to form two smooth portions, one forming an end journalled in the driving shaft, a shift member keyed to the splined portion to turn with the driven shaft and provided with the coacting elements of the positive clutch, an axially shiftable synchronizer located between the shift member and the driving shaft to cause the shafts to approach the same speed, said synchronizer comprising a long sleeve forming a mounting hub fitted to the smooth portion of the driven member between the end and the splined portions and having a part thereof engaging between the adjacent ends of the splines of the splined portion whereby the sleeve is in positive driving relation to the splined portion of the driven shaft and said synchronizer also comprising a flange forming the coacting element of the friction clutch, and said synchronizer including a resilient detent disposed in the path of movement of the shift member as it is moved towards its positive clutching position to cause the friction clutch to become operative prior to the interengaging of the positive clutch elements.

HOWARD J. MURRAY.